July 25, 1967  R. J. FREED  3,332,369
BREAD DOUGH MAKING MACHINE

Filed May 19, 1964  5 Sheets-Sheet 1

INVENTOR.
RUDOLPH J. FREED

BY *Richard J Cowling*

ATTORNEY

July 25, 1967 R. J. FREED 3,332,369
BREAD DOUGH MAKING MACHINE
Filed May 19, 1964 5 Sheets-Sheet 3

INVENTOR.
RUDOLPH J. FREED
BY Richard J. Rawling
ATTORNEY

July 25, 1967  R. J. FREED  3,332,369

BREAD DOUGH MAKING MACHINE

Filed May 19, 1964  5 Sheets-Sheet 4

INVENTOR.
RUDOLPH J. FREED

BY Richard J. Rowling

ATTORNEY 3,332,369
BREAD DOUGH MAKING MACHINE
Rudolph J. Freed, Los Angeles, Calif., assignor to
Bak-Kraft Corporation, Ltd., Los Angeles, Calif.
Filed May 19, 1964, Ser. No. 368,662
5 Claims. (Cl. 107—40)

The present invention relates generally to a machine for treating and developing the texture of bread dough, and it has specific relation to improvements in the machine shown and described in my Letters Patent No. 3,030,898, issued Apr. 24, 1962, for the continuous production of a bread dough which is suitable for immediate dividing and panning without intermediate proofing or molding.

An object of the present invention is to provide means at the dough receiving end of the machine for facilitating a positive infeed of dough into a screw conveyor, which, in turn, delivers the dough into a dough developer, where the dough under pressure is being subjected to rapid mixing to develop the gluten by a variety of folding, stretching and kneading actions, and for discharge under extrusion pressure in a continuous formation ready for immediate dividing and panning.

A further object of the invention is the provision of means for synchronizing the infeed unit with the screw conveyor so as to maintain a constant ratio of dough infeed to the rate of dough being processed.

Another object of the invention is to provide suitable means for controlling, separately and independently, the temperature of the dough while it is passing through the feed screw conveyor and while it is passing through the developer.

A further object of the inventon is the provision of suitable means for adjusting, separately and independently, the speed of the screw conveyor and the speed of the dough developer.

Another object of the invention is to provide an improved loaf forming block through which the developed dough may be extruded for dividing and panning with adjustability for making different size loaves of bread.

Other and further objects and advantages of the invention reside in the detailed construction of the machine, which result in simplicity, economy and efficiency, and which will be apparent from the following description, wherein a preferred embodiment of the invention is shown, reference being had to the accompanying drawings, forming a part hereof, wherein like numerals indicate like parts, in which.

Figure 1:
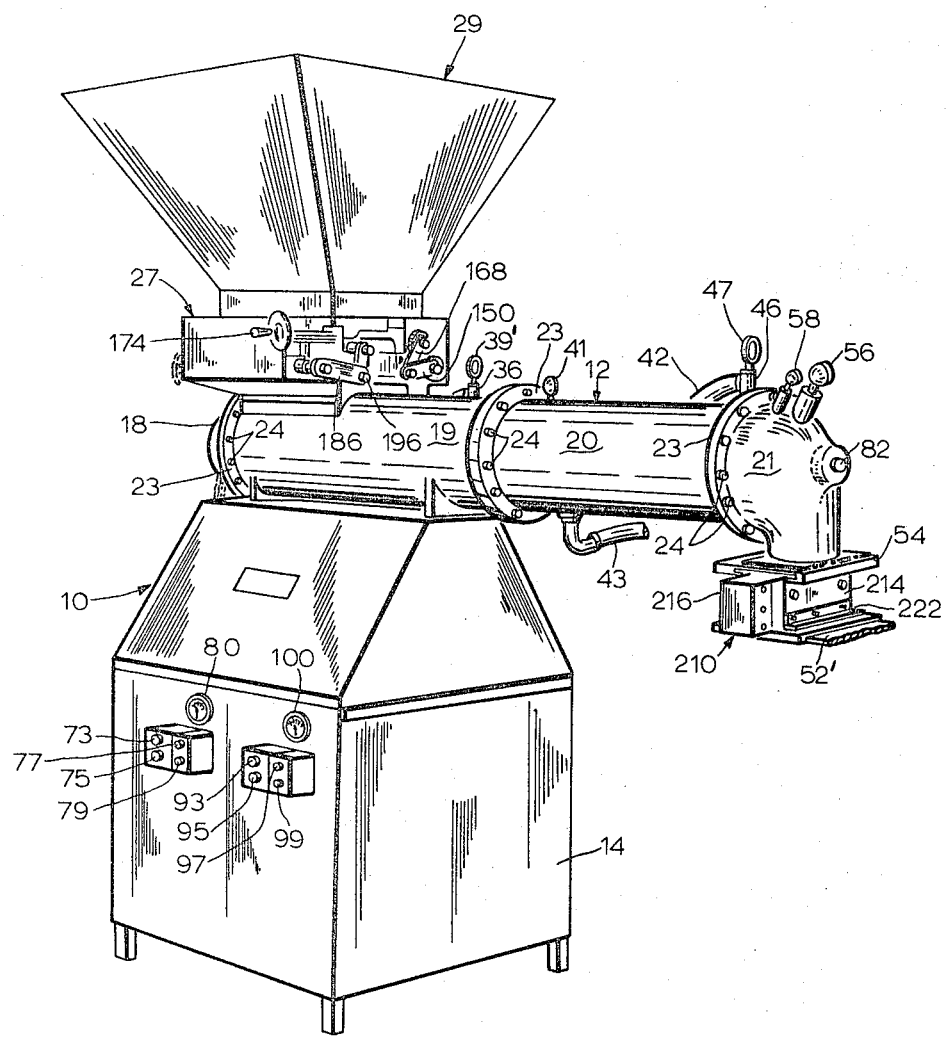
FIGURE 1 is a perspective view of a machine constructed in accordance with the principles of the invention and embodying the new improvements.
Figure 2:
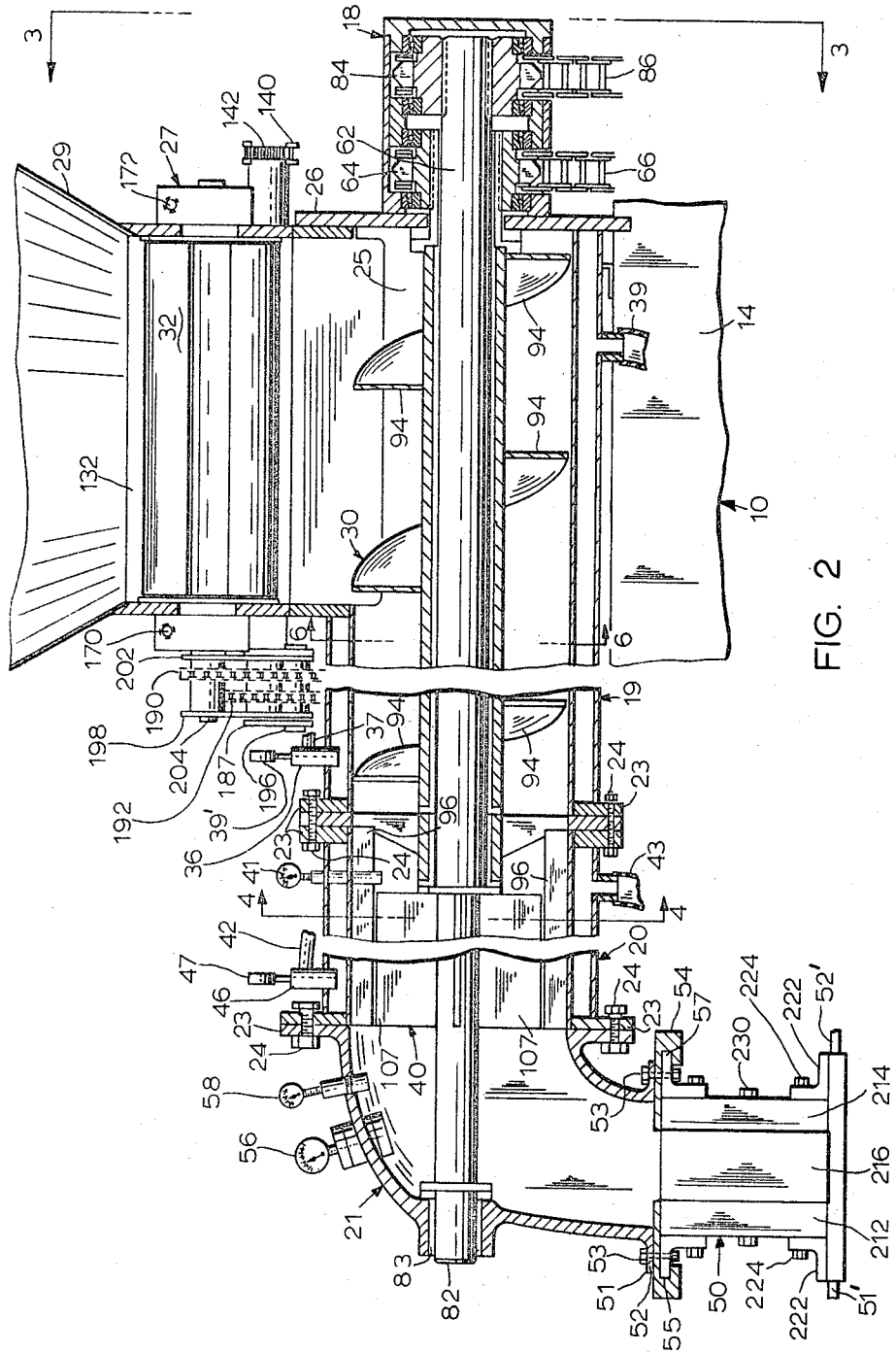
FIGURE 2 is a fragmentary longitudinal sectional view, with parts in elevation, of the machine shown in FIGURE 1, but on a slightly larger scale.

Referring now to the drawings and particularly FIGURES 1 and 2, there is shown a dough treating machine 10 constructed basically along the lines of the machine shown and described in my aforementioned Letters Patent. It consists basically of an elongated tubular horizontally extending housing 12 suitably mounted on a supporting base 14. The horizontally extending tubular housing 12 consists of four separate and distinct units, segments or sections 18, 19, 20 and 21. Each of the sections 19, 20 and 21 has flanged ends 23 which are secured together by bolts 24.

The first segment or section 18, which is at the rear end of the machine and is best shown in FIGURE 2, houses the chains for driving the shafts that, in turn, drive the screw feed conveyor 30 and the dough developer 40.

Figure 5:
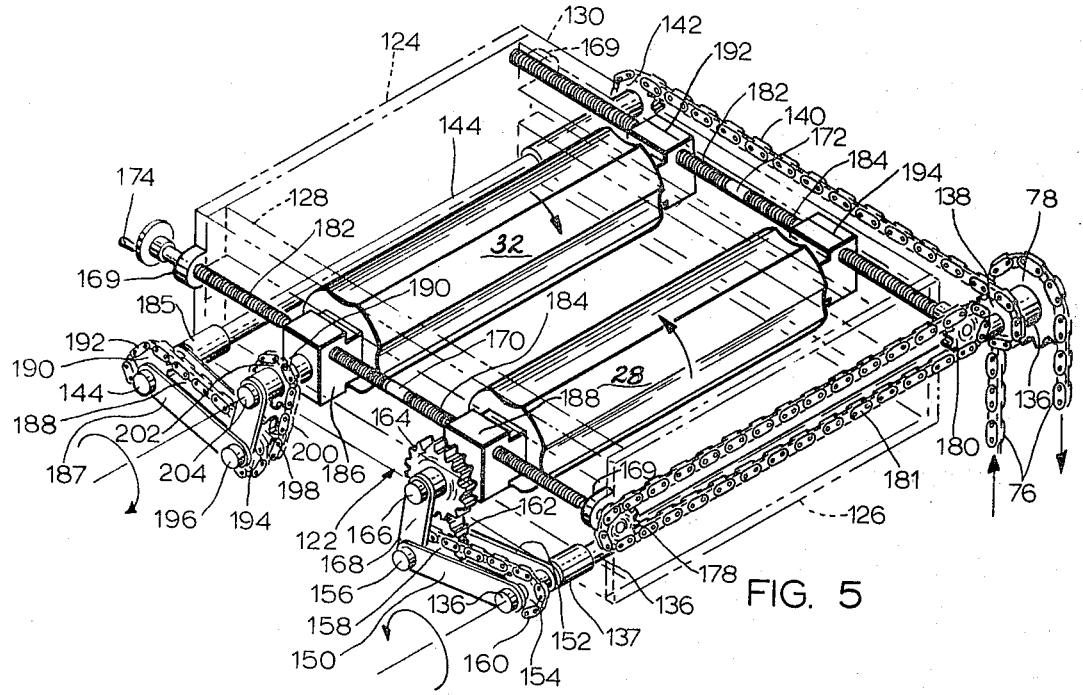
FIGURE 5 is a perspective view of the infeeding unit, with its supporting frame structure shown in dotted lines for the sake of clearness.
Figure 6:
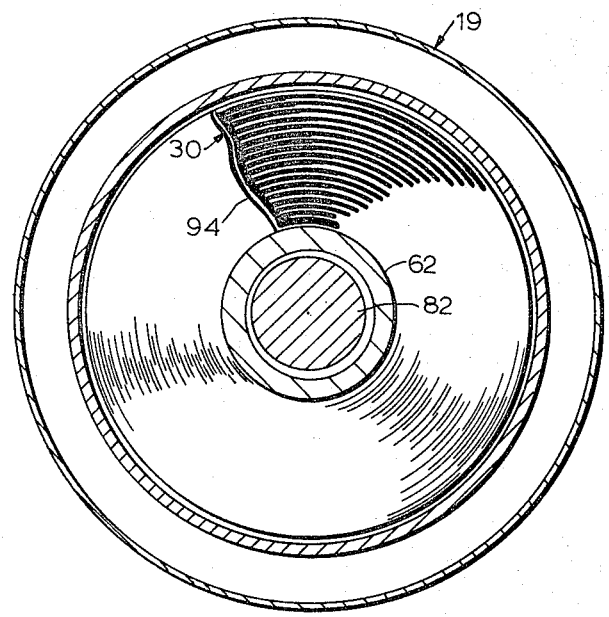
FIGURE 6 is a cross-sectional view of the dough feeding conveyor of the machine, the same having been taken substantially along the line 6—6 of FIGURE 2, looking in the direction of the arrows.
Figure 7:
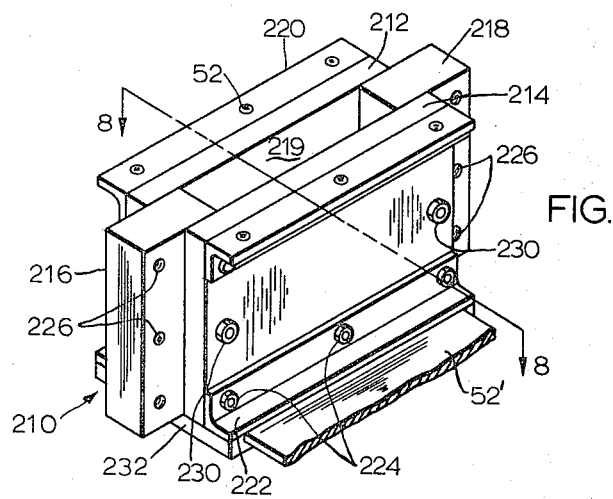
FIGURE 7 is a perspective view of the adjustable loaf-forming block, the same being shown equipped with reciprocating cutting knives, which not only shapes the dough but cuts the continuous extrusion into individual loaf-forming pieces of the proper size and weight.

The second segment or section 19 houses the screw conveyor 30, and has a rectangular top opening 25 adjacent its rear end over which is mounted horizontally a rectangular box-like frame structure 26. The box-like frame structure 26 provides a suitable base for supporting a power driven infeed unit 27, consisting of a pair of spaced fluted steel rollers 28 and 32, as best shown in FIGURE 5. The rollers 28 and 32 are adjustable longitudinally of the infeed unit 27, and are driven by the same motor that drives the screw conveyor 30, as will hereinafter be more fully described. A conventional dough hopper 29 is mounted in any suitable manner above the infeed unit 27 and its spaced rollers 28 and 32. The section 19 is of a double jacketed construction, having an inlet pipe 37 and an outlet pipe 39 for circulating hot and/or cold water therearound to provide a suitable means for controlling the temperature of the dough while passing therethrough. The inlet pipe 37 receives its circulating water from a conventional outside source of supply, including an electrically driven pump and a storage tank. A conventional flow meter 36 mounted in the line 37 indicates and controls the rate of supply of the water to the jacketed segment 19 of the screw conveyor 30, and a thermometer 39′ indicates the temperature of the water in the jacketed system 19. A second thermometer 41 indicates the temperature of the dough passing through the screw conveyor 30.

The third segment or section 20 houses the dough developer 40, and is likewise of a double jacketed construction. This section 20 has an inlet pipe 42 and an outlet pipe 43 for circulating hot and/or cold water therearound to provide a suitable means for controlling the temperature of the dough being developed. Its inlet pipe 42 receives the circulating water from a conventional outside source of supply, including an electrically driven pump and a storage tank. A flow meter 46 indicates and controls the rate of supply of the water and a thermometer 47 indicates the temperature of the water in the jacketed system 20 which surrounds the dough developer 40.

The fourth segment or section 21 of the tubular elongated housing 12 is in the form of a ninety degree elbow, which serves as a small reservoir to receive the dough being discharged from the developer 40. The outer free end of the segment 21 is provided with a radial flange 51, which is apertured, as indicated at 52, to receive bolts. Mounted on the flange 51 by means of bolts 53 is a mounting plate 54, which is provided with a pair of laterally spaced flange trackways 55 and 57 for securing the loaf-forming block 50 thereto, as best shown in FIGURE 2.

The fourth segment or section 21 is equipped with a conventional pressure gauge 56, which indicates the pressure of the extrusion on the dough. A thermometer 58 records the temperature of the dough leaving the dough developer 40.

It will be noted that the extreme forward end of the shaft 82, which drives the developer 40 is journalled in bearings 83 mounted in the forward wall of the segment 21.

The driving mechanism

The driving mechanism is substantially identical with that shown and described in my aforementioned Letters Patent, and reference is hereby made to it for the details of its construction as though it had been incorporated herein at length.

Referring to FIGURE 2, it will be noted that the screw conveyor 30 is driven by a shaft 62. The end of the shaft 62 has a sprocket wheel 64 keyed thereto, which is driven by a chain 66. The opposite end of the chain 66 is entrained over a sprocket keyed to the driving end of a shaft 70 of a motor 72.

It will be noted that the shaft 70 of the motor 72 has a second sprocket wheel 74 keyed thereto (see FIGURE 3), which drives a chain 76. The opposite end of the chain 76 is entrained over a sprocket wheel 78, which serves as the driving means for the infeeding unit 27 hereinafter to be described.

The electric motor 72 is provided with a starter button 73, a stop button 75, and two conventional momentary buttons 77 and 79 forming a part of a motor speed regulating device of conventional construction. By depressing the button 77, the speed of the motor 72 may be increased and by depressing the button 79 the speed of the motor 72 may be decreased. A tachometer 80 visually records the speed of the motor 72 so that the time the momentary buttons 77 and 79 are held in a depressed position need not be a matter of guess-work.

Figure 3:
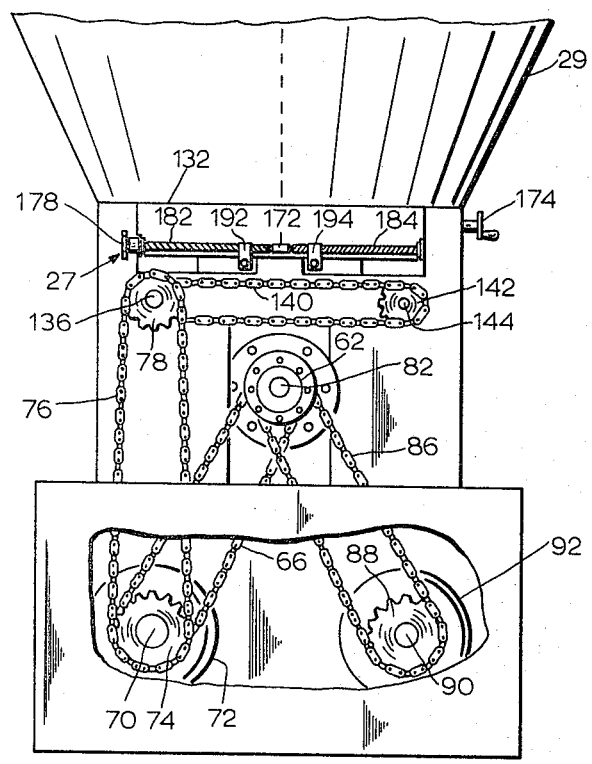
FIGURE 3 is a fragmentary elevational view of the dough receiving end of the machine shown in FIGURE 2, the same having been taken substantially along the line 3—3 thereof, looking in the direction of the arrows, showing in detail the driving mechanism.

The developer 40 is driven by a separate shaft 82, which is mounted within the shaft 62 that drives the screw conveyor 30. The shaft 82 has a sprocket wheel 84 keyed thereto, which engages a chain 86. The opposite end of the chain 86 is entrained over a second sprocket wheel 88, as best shown in FIGURE 3, which is, in turn, keyed to the driving end of a shaft 90 of a motor 92.

The motor 92, like the motor 72, is provided with an electric starter button 93, a stop button 95, and two conventional remote control momentary buttons 97 and 99, forming a part of a motor speed regulating device of conventional construction. By depressing the button 97, the speed of the motor 92 may be increased as long as the button is being depressed. By depressing the button 99, the speed of the motor 92 may be decreased as long as the button is being depressed. A tachometer 100 visually records the speed of the motor 92 so that the time the momentary buttons 97 and 99 are held down in a depressed position need not be a matter of guess-work.

The screw conveyor

The screw conveyor 30, which is mounted within the segment 19 of the tubular housing 12, consists of a standard feed screw having a fixed helical impeller blade 94 mounted on its shaft 62. The impeller blade 94 serves to move the dough forwardly and force it under pressure into the developer 40.

The dough developer

Figure 4:
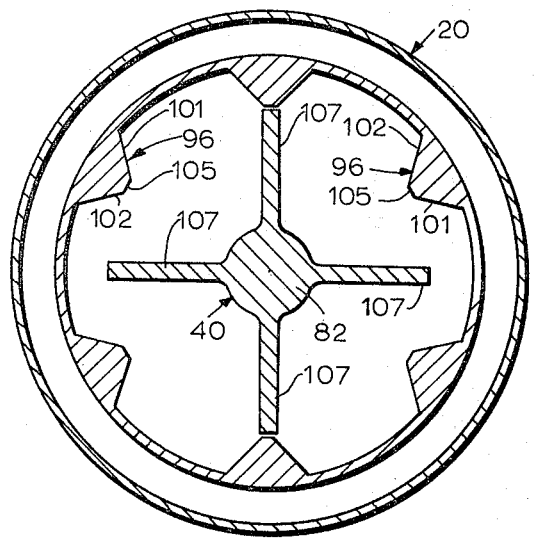
FIGURE 4 is a cross-sectional view of the dough developing chamber of the machine, the same having been taken substantially along the line 4—4 of FIGURE 2, looking in the direction of the arrows.

The developer 40, which is best shown in FIGURE 4, is mounted within the segment 20 of the tubular housing 12. The inner circumferential surface of the segment 20 has a plurality of circumferentially spaced longitudinally extending fixed radial blades or protuberances 96. Each of the blades 96 is welded or formed integrally with the inner surface of the housing. Each blade 96 has converging sides 101 and 102 and a truncated inner edge 105.

The shaft 82 of the developer 40 is provided with a plurality of integrally formed circumferentially spaced radially extending paddle blades 107. It will be noted that the paddle blades 107 extend to the forward end of the developer segment 20 and also extend radially to a distance just short of the truncated edges 105 of the fixed blades 96.

The in-feed mechanism

There is shown in FIGURE 5 the structural details of the in-feed mechanism 27. This mechanism 27, as best shown in FIGURES 1 and 3, is mounted on a supporting box-like frame structure 122, having a front wall 124, a back wall 126 and two side walls 128 and 130. The frame structure 122 is mounted over the opening 25 in the second segment or section 19 in any suitable manner, as by bolts or welding, and serves as a base for mounting the discharge end 132 of a conventional gravity hopper 29 thereabove.

The infeed mechanism 27 is driven by the chain 76 and sprocket wheel 78, which is keyed to one end of a shaft 136 suitably mounted transversely of the frame structure 122. The shaft 136 has a second sprocket wheel 138 keyed thereto, which drives a chain 140 extending longitudinally of the frame structure 122 and parallel to the sidewall 130. The opposite end of the chain 140 is entrained over a sprocket wheel 142 mounted on one end of a shaft 144, which extends beyond the sidewall 130. The shaft 144 is mounted in the walls 128 and 130 and its opposite ends project outwardly therefrom.

The opposite outer end of the shaft 136 has a spacer 137 and a pair of spaced inwardly extending arms 150 and 152 mounted freely thereon. Between the spaced arms 150 and 152 on the shaft 136 is keyed a sprocket wheel 154. The opposite ends of the arms 150 and 152 are mounted in spaced relation on a shaft 156. The shaft 156 has a sprocket wheel 158 keyed thereto between the arms 150 and 152. A chain 160 connects the sprocket wheels 154 and 158. The shaft 156 also has a spur gear 162 keyed thereto (see FIGURE 5). The spur gear 162 enmeshes with a spur gear 164 keyed to a shaft 166. A connecting arm 168 is mounted to rotate freely on the shafts 156 and 166.

There is mounted on spaced brackets 169 on the outside of the frame structure 122 adjacent each of the sidewalls 128 and 130 a pair of spaced rods 170 and 172. The rod 170 has a hand wheel 174 mounted fixedly adjacent its forward end, and a fixed sprocket wheel 178 adjacent its back or opposite end. The rod 172 has a fixed sprocket wheel 180 mounted adjacent its back end, which is in alignment with the sprocket wheel 178 on the rod 170. The sprocket wheels 178 and 180 are connected by a chain 181. When the rod 170 is rotated by its hand wheel 174, its sprocket wheel 178 rotates, driving the chain 181, which, in turn, drives the sprocket wheel 180. The rotation of the sprocket wheel 180 is imparted to the rod 172. Therefore, both rods 170 and 172 will always move in unison.

The rods 170 and 172 have spaced threaded sections 182 and 184, respectively, the threads on the sections 182 being right hand threads and the threads on the sections 184 being left hand threads. A pair of blocks 186 and 188 are threadingly mounted on the threaded sections 182 and 184 of the rod 170, and a second pair of blocks 192 and 194 are threadingly mounted on the threaded sections 182 and 184 of the rod 172. These blocks 186 and 188 and 192 and 194, which are mounted on the rods 170 and 172 respectively, will be moved toward and/or away from each other, depending upon in which direction the hand wheel 174 is turned.

The opposite end of the shaft 144 extends beyond the sidewall 128 of the frame structure 122. It has a spacer 185 and a pair of spaced arms 187 and 188 mounted pivotally thereon. A sprocket wheel 190 is keyed to the shaft 144 between said spaced arms 187 and 188. The sprocket wheel 190 drives a chain 192, whose opposite end is entrained over a sprocket wheel 194, which is keyed to a shaft 196 mounted between the opposite ends of the spaced arms 187 and 188. The shaft 196 also has a sprocket wheel 198 keyed thereto, which drives a chain 200. The opposite end of the chain 200 is entrained over a sprocket wheel 202, which, in turn, is mounted on one end of a shaft 204.

The shaft 204 is mounted transversely of the frame structure 122 between the blocks 186 and 192. The shaft 166 is likewise mounted transversely of the frame structure 122 between the blocks 188 and 194. The shaft 204 has a fluted roller 32 keyed thereto between the blocks 186 and 192. The shaft 166 likewise has a fluted roller 28 keyed between the blocks 188 and 194. Thus, it will be apparent that the fluted rollers 32 and 28 will rotate with their respective shafts 204 and 166 towards each other, as indicated by the arrows in FIGURE 5. The handle 174 permits the distance between the fluted rollers 32 and 28 to be varied manually. The linkage arrangement shown on the left side of FIGURE 5 provides the means for driving said fluted rollers 32 and 28, and also permits the shafts 204 and 166 to be moved towards and/or away from one another without dismantling the in-feed mechanism or stopping the machine.

*The loaf forming block*

Referring now to FIGURES 7 through 10, there is shown a loaf-forming block or die 210 for shaping the dough extrusion as it leaves the discharge opening in the bottom of elbow shaped segment 21 of the tubular housing 12.

The forming block 210 is rectangular in shape, and is made up of four spaced and separate parts, to-wit: two sidewalls 212 and 214, and two end walls 216 and 218, providing an elongated passageway or shaping slot 219 therethrough. It will be noted the top and bottom edges of each of the sidewalls 212 and 214 are provided with removable angular flanges 220 and 222 secured by bolts 224. It will be noted the end walls 216 and 218 have a series of spaced rows of vertically spaced apertures 226, which will permit their mounting by bolts 230 and the bolts 224 in different positions, depending upon the size of the loaf to be formed.

Figure 8:
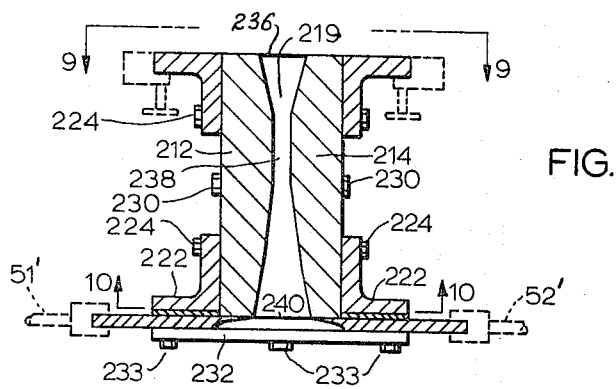
FIGURE 8 is a vertical sectional view of the loaf-forming block shown in FIGURE 7, the same having been taken substantially along the line 8—8 thereof, looking in the direction of the arrows.

There is shown at the base of the forming block 210 a slotted plate 232 mounted by bolts 233, and a fragmentary portion of each of the reciprocating knives 51' and 52' for severing the dough extrusions into loaf-forming segments. This cutting mechanism forms no part of the present invention, but has been illustrated diagrammatically merely to show how and where the cutting means is attached to the present machine. The cutting blades 51' and 52' are reciprocated in timed sequence with a conventional and portable pan conveyor unit (not shown). Extrusions of dough from the loaf-forming block 210 are possible only when the knives 51 and '52' are in their open position, as shown in FIGURE 8. When the knives 51' and 52' are in their closed position, the discharge opening or shaping slot 219 is closed to bar the extrusion of dough from the segment 21.

FIGURE 8 shows a cross-section of the loaf-forming block 210. It will be noted that the sides 212 and 214 of the dough receiving end 236 of the passageway 219 taper or converge inwardly for a short distance and connect with an intermediate section 238 having parallel sides forming a reduced passageway and then the sides of the passageway 219 taper outwardly or diverge from the lower end of the intermediate section 238, as indicated at 240, with the widest portion being at the point of discharge, which is contiguous to the cutting blades 51' and 52'

Figure 9:
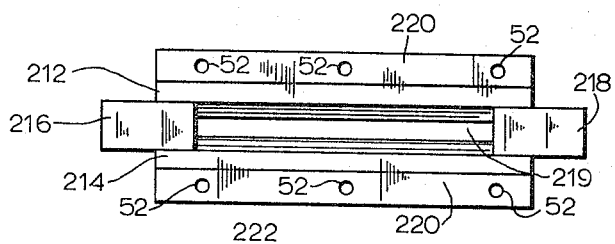
FIGURE 9 is a top plan view of the loaf-forming block shown in FIGURE 8, the same having been taken substantially along line 9—9 thereof, looking in the direction of the arrows.
Figure 10:
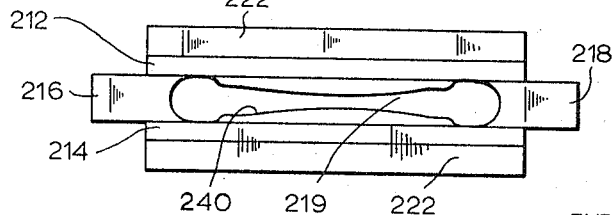
FIGURE 10 is a bottom plan view of the loaf-forming block shown in FIGURE 8, the same having been taken substantially along the line 10—10 thereof, looking in the direction of the arrows.

FIGURE 9 is a top plan view of the loaf-forming block 210, and it will be noted that the dough receiving slot 219 is substantially rectangular in shape at its top. The discharge end of the dough forming slot 219 is shown in FIGURE 10, and it will be noted that it has the shape of a dumbbell with enlarged rounded ends.

*The operation of the machine*

The tubular housing 12 of the machine shown in the drawing is slightly over six feet in length, and its dough conveying segment 19 is approximately twice the length of the developer segment 20. The screw conveyor 30 is driven at a speed of between thirty and thirty-five revolutions per minute while the dough developer 40 operates at a speed of approximately three hundred revolutions per minute, developing a pressure of approximately fourteen pounds per square inch on the dough therein. The diameter of the screw conveyor and developer governs the production capacity of the machine. With a tubular diameter of six inches, the machine can process approximately three thousand six hundred pounds of dough per hour. A unit ten inches in diameter can process approximately six thousand pounds of dough per hour. At normal operating speeds, the six inch diameter machine will yield forty to fifty dough pieces per minute. If the speed is increased, the pressure on the dough is raised correspondingly, thereby reducing the time required for dough development and increasing the rate of output.

It will be noted that the dough infeed unit 27 is driven by the motor 72 that drives the screw conveyor 30. The speed of rotation of the fluted rollers 32 and 28 exerts a positive frictional delivery pressure on the dough being fed into the screw conveyor 30. These rollers 32 and 28 not only insure uniform infeeding of the dough from the hopper 29 to the screw conveyor 30, but by synchronizing the speed of the rollers 32 and 28 with said screw conveyor 30, there is maintained a constant ratio of dough infeed to the rate of dough processing.

The screw conveyor 30 has a two fold purpose, to wit: Firstly, it moves the dough into the developer 40, and, secondly, it places a controlled and predetermined pressure on the dough. This pressure establishes the proper conditions for dough development and controls the rate of processing. It also contributes to fine grain formation by causing the distribution of the fermentation gas in the dough and the formation of minute cells upon the release of the pressure.

Both the screw conveyor 30 and its infeed unit 27 are driven by the electric motor 72 which is equipped with momentary buttons 77 and 79 of conventional construction. The dough developer 40 has its own motor 92, which is likewise equipped with momentary buttons 97 and 99, forming a part of a motor speed regulating device of conventional construction. This permits the speed of the motors 72 and 92 to be adjusted independently with respect to each other, as previously described.

The dough gravitating from the hopper 29 enters between the infeeding rollers 32 and 28 at a temperature of approximately 93 degrees F., and the optimum temperature for scaling is approximately 98 degrees F. Obviously, the machine must have suitable temperature controls over the dough while it is passing therethrough. The amount of cooling needed is generally small enough to be supplied by existing refrigeration in the plant, and the actual control is effected by varying the amount and temperature of the water being circulated in each system. A greater temperature rise will be produced in the developer 40 than in the screw conveyor 30. Consequently such temperatures may be more accurately controlled by providing the screw conveyor 30 and dough developer 40 with independent systems. This can be done in one or two ways, to-wit: Either by regulating the temperature of the water being circulated through the jacketed housings that surround the screw conveyor segment 19 and the dough developer segment 20, or by regulating the rate of flow of the water in each system. With independent systems, no difficulty will be encountered in controlling the temperature of the dough throughout the machine.

Normally, the machine will require the use of cold, refrigerated, water to control the temperature of the dough passing through the machine, since heat is always generated in the machine due to the pressure being built-up in the dough passing therethrough. However, in small bakeries during the winter months, it is sometimes necessary to warm up the machine before starting production. In such a situation, it may be found advisable to first circulate warm water through the jacketed housings of the screw conveyor segment 19 and the dough developer segment 20. Of course, steam could be used to preheat the jacketed housings or the water to be circulated therethrough.

Most bakeries have steam and refrigeration available for heating and/or cooling the water to be used in the jacketed systems of the sections 19 and 20. However, if such is not the case, a small refrigerating system can be coupled with the water storage tanks for cooling the water usually needed to control the heat generated in the screw conveyor 30 and dough developer 40 so as to maintain the dough being processed at the proper temperatures.

The elbow shaped discharge segment 21 acts as a small reservoir from which the dough may be fed into the loaf-forming block 210. The flanged trackways 55 and 57 provide suitable means for removably mounting the block 210 thereon, and the flanges on the opposite and lower end of the loaf-forming block 210 likewise provides means for connecting the pan conveying unit with its conventional reciprocating cutting knives 51' and 52' thereto. These kives 51' and 52', which are conventional and form no part of the present invention, may be operated at varying speeds from forty to eighty cuts per minute. They are operated from and synchronized with the pan conveyor unit (not shown) since a pan must be in position for receiving each cut loaf. By making the loaf-forming block 210 adjustable to vary the size of its extrusion slot 219, the individual dough pieces may be varied from nineteen to thirty-eight ounces in weight per piece.

During the initial stage of a production run, the dough pieces as they are extruded and cut are weighed to check their scaling weight. Weight corrections may be made rapidly and accurately by either speeding the operation of the machine forming the present invention or by adjusting the operating speed of the reciprocating knives Once the proper scaling weight adjustments have been made, all subsequent dough pieces will show the same unvariable weight and no further adjustments need be made.

The dough developing machine 10 will be found particularly useful by bakers who want to retain the flexibility that is inherent in the traditional bread making process, yet strive for a loaf with uniformly fine grain and resilient texture, the smooth crust characteristics of continuously mixed bread, and the flour and eating qualities long associated with good bread baking.

Although I have only described in detail one modification which the invention may assume, it will be apparent to those skilled in the art that other modifications may be made therein without departing from the spirit of the invention.

What I claim is:

1. In a machine of the class described, comprising a dough hopper, a screw dough feeding conveyor, a dough developer and a loaf forming block, means for driving said screw conveyor, means for driving said dough developer, and, in combination with said hopper and said screw conveyor an infeeding unit, means connected with said driving means of said screw conveyor for driving and thereby synchronizing said infeeding unit to maintain a constant ratio of dough infeed to the rate of dough output of said screw conveyor, said infeeding unit including a pair of spaced driven rollers rotating towards each other.

2. A machine in accordance with claim 1 wherein said rollers of said infeeding unit may be adjusted towards and away from each other to vary the space therebetween.

3. A machine in accordance with claim 1 wherein said infeeding unit includes a hand-wheel for moving said rollers of said infeeding unit toward and away from each other to change the size of the opening therebetween through which the dough is fed from the hopper to the screw conveyor.

4. A machine in accordance with claim 1 wherein the feeding rollers have a fluted surface to facilitate the feeding of the dough from the hopper to said screw conveyor.

5. In a machine of the class described, comprising an elongated tubular housing having a dough hopper mounted adjacent one end for the gravity feeding of dough to said housing, a screw conveyor for receiving said gravitating dough from said dough hopper and moving it forwardly and into a dough developer, a dough developer between said delivery end of said screw conveyor and the discharge end of said housing, said developer having a series of spaced fixed blades and a series of rotating blades for developing said dough as it passes therethrough, means for driving said screw conveyor at varying speeds, means for driving said developer at varying speeds, and, in combination therewith, (a) a dough infeeding unit mounted between the discharge end of said dough hopper and the receiving end of said screw conveyor, (b) said infeeding unit having a pair of adjustably spaced dough feeding rollers and means connected with said driving means of said screw conveyor for driving said dough feeding rollers towards each other for engaging the dough and feeding it into said screw conveyor, (c) said housing for said screw conveyor being double jacketed and having an inlet and at outlet for circulating a coolant medium therearound for controlling the temperature of the dough therein, (d) said housing for said dough developer being double jacketed and having an inlet and an outlet for circulating a coolant medium therearound for controlling the temperature of the dough in said developer, and (e) a discharge outlet connected with the discharge end of said developer at the forward end of said tubular housing for delivering said developed dough into a loaf-forming block, (f) said outlet having a pressure gauge for indicating the pressure on the dough as it passes through said discharge outlet, (g) said discharge outlet having means for attaching a loaf-forming block thereto for shaping the extrusion being discharged therefrom, and (h) reciprocating knives mounted adjacent the discharge end of said block for severing said extrusion of dough for panning.

References Cited

UNITED STATES PATENTS

| | | | |
|---|---|---|---|
| 1,350,722 | 8/1920 | Goodenberger | 107—14 X |
| 1,383,177 | 6/1921 | Venn. | |
| 2,197,988 | 4/1940 | Tanzi | 107—14.7 |
| 2,713,313 | 7/1955 | Femina | 107—14.7 |
| 2,939,407 | 6/1960 | Keathley et al. | 107—15 |
| 2,953,460 | 9/1960 | Baker | 107—30 |
| 3,008,434 | 11/1961 | Maldari | 107—14 |
| 3,030,898 | 4/1962 | Freed | 107—40 |
| 3,059,595 | 10/1962 | Locatelli | 107—14.4 |
| 3,155,056 | 11/1964 | Smith et al. | 107—36 |
| 3,207,089 | 9/1965 | Ivarson | 107—4.3 |

WALTER A. SCHEEL, *Primary Examiner.*

J. SHEA, *Assistant Examiner.*